(12) United States Patent
Ansari et al.

(10) Patent No.: US 7,595,018 B2
(45) Date of Patent: Sep. 29, 2009

(54) MOLDED ARTICLE PICKER

(75) Inventors: Omeir Shahid Ansari, Markham (CA); Dan Robert Gidden, Bradford (CA)

(73) Assignee: Husky Injection Molding Systems Ltd., Bolton, ON (CA)

( * ) Notice: Subject to any disclaimer, the term of this patent is extended or adjusted under 35 U.S.C. 154(b) by 247 days.

(21) Appl. No.: 11/549,739

(22) Filed: Oct. 16, 2006

(65) Prior Publication Data

US 2008/0089972 A1 Apr. 17, 2008

(51) Int. Cl.
 *B66C 1/02* (2006.01)
(52) U.S. Cl. .............. 264/571; 264/232; 264/538; 264/542; 425/445; 425/534
(58) Field of Classification Search .............. 425/185, 425/444, 445, 437, 534, DIG. 60; 414/793, 414/797; 264/232, 335, 542, 538, 571
See application file for complete search history.

(56) References Cited

U.S. PATENT DOCUMENTS

| 4,589,648 | A | * | 5/1986 | Hancock ............... 271/106 |
| 4,625,953 | A | * | 12/1986 | Hamatani .............. 271/1 |
| 4,640,503 | A | * | 2/1987 | Naumann .............. 271/103 |
| 4,729,732 | A | | 3/1988 | Schad et al. |
| 4,763,778 | A | * | 8/1988 | Feddersen et al. ...... 198/867.08 |
| 4,890,726 | A | * | 1/1990 | Wissmann ............. 198/803.12 |
| 4,919,587 | A | * | 4/1990 | Tashiro et al. .......... 414/795.8 |
| RE33,237 | E | | 6/1990 | Deifer |
| 5,114,327 | A | | 5/1992 | Williamson et al. |
| 5,688,008 | A | * | 11/1997 | Hansch ............... 294/64.1 |
| 6,062,799 | A | * | 5/2000 | Han et al. ............ 414/416.07 |
| 6,171,541 | B1 | | 1/2001 | Neter et al. |
| 6,247,891 | B1 | * | 6/2001 | Lind ................. 414/811 |
| 6,769,895 | B2 | * | 8/2004 | Derouault et al. ........ 425/145 |
| 6,802,705 | B2 | | 10/2004 | Brand et al. |
| 6,886,827 | B2 | * | 5/2005 | Dachtler ............... 271/106 |
| 6,951,452 | B2 | * | 10/2005 | Unterlander et al. ....... 425/145 |
| 6,971,838 | B2 | * | 12/2005 | Johnson et al. ......... 414/796.7 |
| 7,083,407 | B2 | * | 8/2006 | Seki et al. ............. 425/534 |
| 7,261,547 | B2 | | 8/2007 | Romanski |
| 2004/0121038 | A1 | * | 6/2004 | Seki et al. ............. 425/529 |
| 2004/0258791 | A1 | * | 12/2004 | Neter et al. ............ 425/546 |
| 2006/0121153 | A1 | | 6/2006 | Neter et al. |
| 2006/0204605 | A1 | * | 9/2006 | Neter et al. ........... 425/526 |

FOREIGN PATENT DOCUMENTS

EP 1123189 8/2001

* cited by examiner

*Primary Examiner*—Joseph S. Del Sole
*Assistant Examiner*—Emmanuel S Luk

(57) ABSTRACT

Disclosed are a molded article picker for a post-mold device and a related method for the use of the molded article picker for handling a molded article. The molded article picker includes a structure having a surface defining an interior that is configured to surround an end portion of the molded article. A sealing surface disposed on the structure is configured to sealingly cooperate with a surface of an outwardly projecting portion of the molded article in response to an evacuation of the interior, wherein the seal allows for the molded article to be retained with the structure.

2 Claims, 5 Drawing Sheets

MOLDED ARTICLE PICKER

TECHNICAL FIELD

The present invention generally relates to molded article pickers, and more specifically the present invention relates to, but is not limited to, a post-mold device including the molded article picker.

BACKGROUND

Some injection molded articles, for example plastic preforms of the variety that are for blow molding into beverage bottles, require extended cooling periods to solidify into substantially defect-free molded articles. To the extent that the cooling of the molded article can be effected outside of the injection mold by one or more post-mold device then the productivity of the injection mold may be increased (i.e. lower cycle time). A variety of such post-mold mold devices, and related methods, are known and have proven effective at the optimization of the injection molding machine cycle time.

In a typical injection molding system a just-molded, and hence only partially cooled, molded article is ejected from the injection mold and into a post-mold device, commonly known as a take-out device or end-of-arm-tool (EOAT), having a cooled carrier (otherwise known as a cooling tube, take-out tube, cooling sleeve, amongst others) for post-mold cooling of the molded article outside of the mold.

U.S. Pat. No. Re. 33,237 describes a post-mold device for removing partially cooled injection molded preforms from the core side of an injection mold. The preforms are ejected from the mold directly into cooled carriers (such as that described in commonly assigned U.S. Pat. No. 4,729,732), and transported by the post-mold device to an outboard position adjacent the mold. The post-mold device includes multiple sets of carriers to accommodate multiple sets of preforms (i.e. multiple shots of preforms).

Commonly assigned U.S. Pat. No. 6,171,541 describes another post-mold device that includes a set of cooling pins for insertion into the interior of a partially cooled preform, the preform arranged in a cooled carrier of the first post-mold device, to discharge a cooling fluid therein. An example of the foregoing is sold under the trade name of COOLJET, a trademark of Husky Injection Molding Systems Limited. Also disclosed is a procedure to apply a vacuum through the same cooling pin to cause the preform to remain with the pin when it is moved away from the carrier holding the preform, thereby removing the preform from the carrier. The pins, mounted to a frame, may be rotated 90 degrees to a discharge position and the vacuum terminated to allow the preforms to fall off the pins.

While the preforms are held by the pin, under vacuum, there may be contact between the end of the pin and the inside surface of the preform, or, between the open end of the preform and a face of a plate upon which the pins are arranged. As the preform is typically blown into an aseptic bottle, it is not accepted by all to touch the inside or end surfaces of the preform with the tooling (i.e. pin or plate) for fear of contamination.

U.S. Pat. No. 5,114,327 describes an post-mold device for cooling a molded article. The post-mold device includes a receiver and cooling head that cooperate for circulating, and subsequently recovering, a coolant, such as liquid carbonic, around the molded article.

U.S. Pat. No. 6,802,705 describes a post-mold device for cooling an end portion of the molded article. The post-mold device includes a deflecting plate insert for directing a coolant flow over an exposed end portion of a molded article, such as a preform, that is arranged in a carrier of a post-mold device.

SUMMARY

According to a first aspect of the present invention, there is provided a molded article picker for a post-mold device. The molded article picker includes a structure having a surface defining an interior that is configured to surround an end portion of the molded article. A sealing surface disposed on the structure is configured to sealingly cooperate with a surface of an outwardly projecting portion of the molded article in response to an evacuation of the interior, wherein the seal allows for the molded article to be retained with the structure.

According to a second aspect of the present invention, there is provided a post-mold device including the molded article picker. The molded article picker includes a structure having a surface defining an interior that is configured to surround an end portion of the molded article. A sealing surface disposed on the structure is configured to sealingly cooperate with a surface of an outwardly projecting portion of the molded article in response to an evacuation of the interior, wherein the seal allows for the molded article to be retained with the structure.

According to a third aspect of the present invention, there is provided a method for transferring a molded article comprising the steps of surrounding an end portion of the molded article within an interior of a structure, evacuating the interior to configure a seal between a sealing surface disposed on the structure and a surface of an outwardly projecting portion of the molded article, wherein the seal allows for the molded article to be retained with the structure.

A technical effect of the aspects of the present invention is to be able to handle a molded article, and in particular a preform having a bottle finish, without touching certain portions of the molded article that must remain in an aseptic state.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

DETAILED DESCRIPTION

The exemplary embodiments of a molded article picker are described below.

Figure 1:
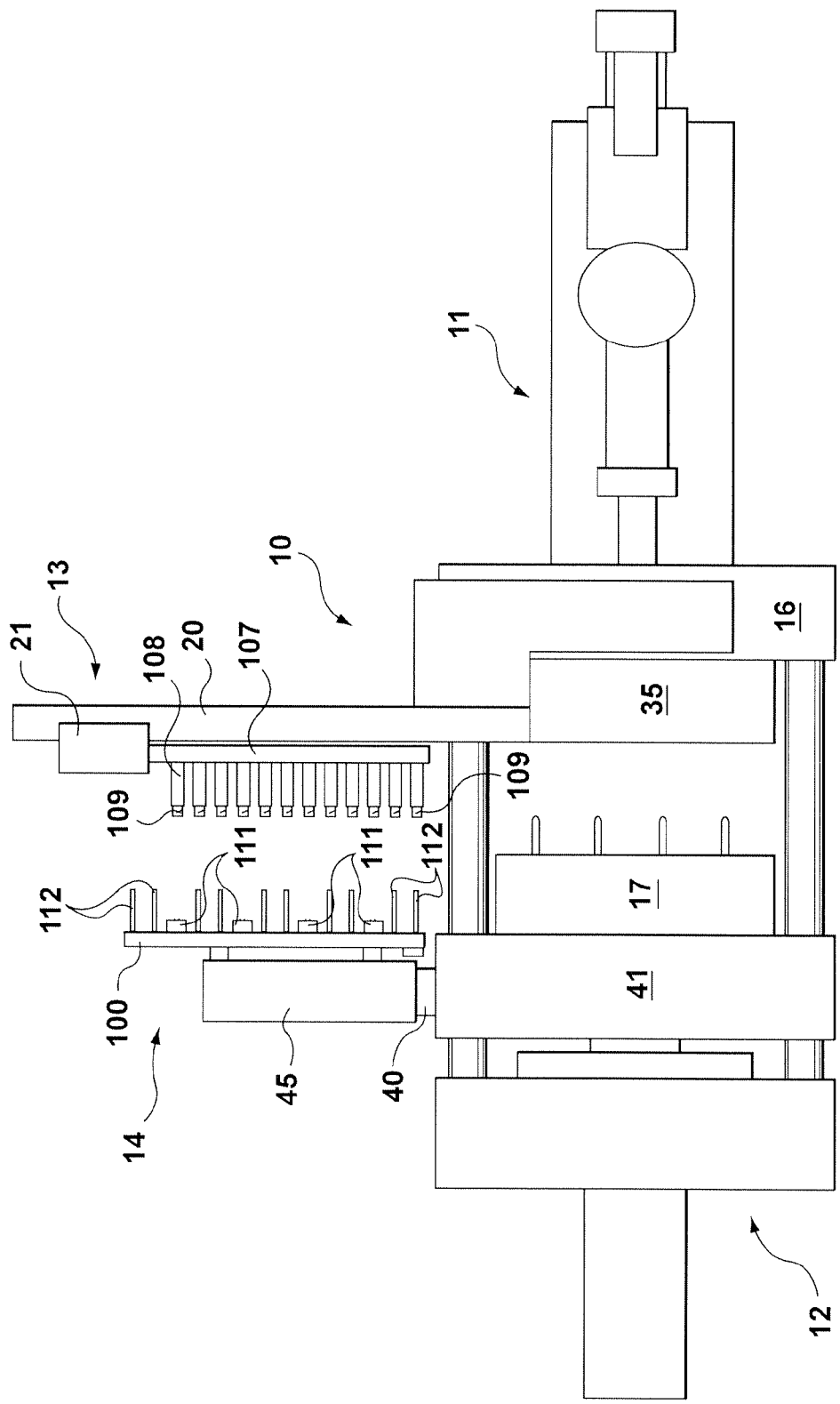
FIG. 1 is a plan view of an injection molding machine including a presently preferred embodiment of the molded article picker that is arranged on a post-mold device.

With reference to FIG. 1, a top plan view of an exemplary injection molding machine 10 is shown comprising, an injection unit 11, a clamp unit 12, a first post-mold device 13, and a second post-mold device 14. An injection mold comprising a cavity and core half 35, 17, is shown arranged between the stationary and moving platens 16, 41 of the clamp unit 12.

The first post-mold device 13 is mounted on the stationary platen 16 and includes a beam 20 that projects to the non-operator side of the machine and upon which rides a carriage 21, moved along the beam by (typically) a servo-electric driven belt drive (not shown). A tooling plate 107 is attached to the carriage 21. Multiple sets of carriers 108, three in the exemplary embodiment, are mounted on plate 107 and may be cooled for transporting multiple molded shots of molded articles 109 (the 'molded article' will be henceforth referred to as a 'preform' in keeping with the context of the exemplary embodiment) ejected from the mold from an inboard (loading) position (not shown).

The second post-mold device 14 includes a tooling plate 100 upon which are mounted multiple sets of cooling pins 112, two sets in the exemplary embodiment, and a set of molded article pickers 111 in accordance with the preferred embodiment. The molded article pickers 111 are provided in every third row.

A rotatable mount 40, 45 attaches the tooling plate 100 to moving platen 41 for rotation through an arc. The rotation of the tooling plate 100 can be effected, for example, by an electric drive (not shown) mounted to the rotatable mount 40, 45.

In operation, a shot of preforms 109 are transferred into a set of empty carriers 108 when the mold is open and the tooling plate 107 is positioned such that the empty carriers 108 are aligned with molded articles on the core half 17. The tooling plate 107 is then moved to its outboard position by the carriage 21, as shown in FIG. 1. The mold is then closed and clamped for the next molding cycle.

Meanwhile, as the mold closes, the tooling plate 100 of the second post-mold device 14 moves towards the molded article carriers 108, whereby the sets of cooling pins 112 are arranged within the interior of the corresponding preforms 109 that have been most recently molded, and the molded article pickers 111 are arranged to surround an end portion of the preforms 109 that have been in the carriers 108 the longest. In this embodiment, the set of preforms 109 will have been held by the carriers 108 through three molding cycles before they are engaged by the molded article pickers 111 and withdrawn from the carriers 108. The tooling plate 100 is then rotated 90 degrees and the articles held by the molded article pickers 111 are dropped onto a conveyor (not shown) beneath the machine. The remaining articles continue to be held in their carriers 108 by vacuum.

The molded article pickers 111, as shown in this embodiment, do not include cooling pins. By not providing cooling pins with the molded article picker 111, the need to switch from air to vacuum within the cooling pins is avoided. Of course, the lack of cooling pins reduces, by one third, the length of time that the preforms are cooled by the cooling pins. Where this is a concern, cooling pins could be introduced or a fourth set of carriers added to the multi-position take off plate so the articles can stay on the carriers 108 for four molding cycles. These solutions do increase the complexity of the machine.

Figure 2:
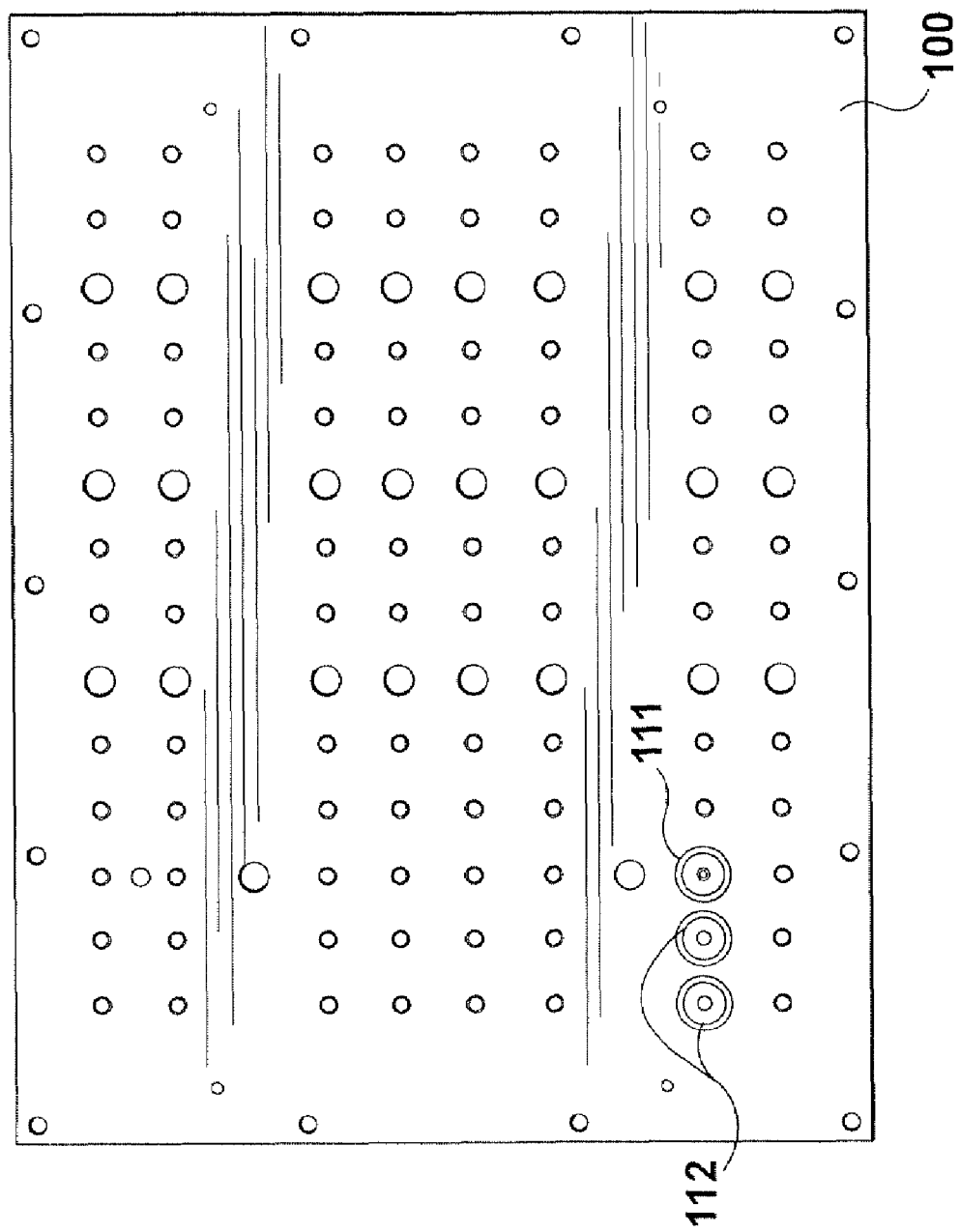
FIG. 2 is a plan view of a partially assembled post-mold device that includes the presently preferred molded article picker.

As shown in FIG. 2, the tooling plate 100 includes apertures for accommodating a plurality of columns and rows of molded article cooling devices 112 (the cooling device may be, for example, a cooling pin in keeping with the context of the exemplary embodiment, and henceforth will be referred to as such), and pickers 111 (a representative cooling pin 112 and molded article picker 111 is shown for the three sets of this exemplary embodiment). In particular, in this configuration the apertures of every third column are configured to accommodate a molded article picker 111 and the apertures of the remaining columns are configured to accommodate cooling pins 112.

Figure 3:
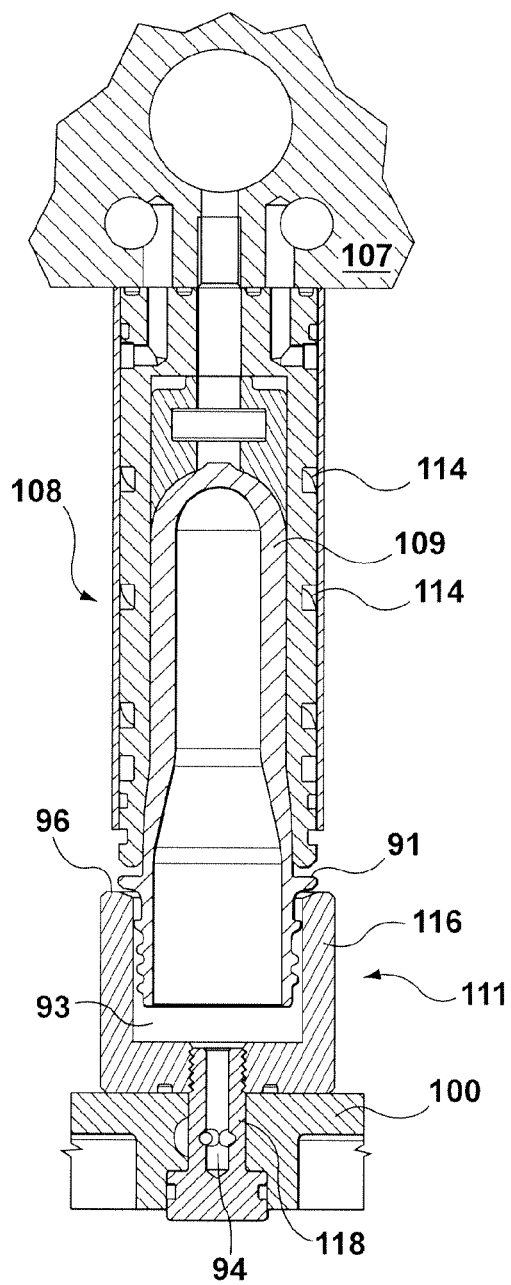
FIG. 3 is a sectional view of the preform being transferred from the carrier to the presently preferred molded article picker.

As shown in FIG. 3, the preform 109 is undergoing transfer from the carrier 108 to the presently preferred embodiment of the molded article picker 111. The carrier 108 includes cooling channels 114 for cooling the preform 109 through its exterior surface in a manner well known in the art. The presently preferred embodiment of the molded article picker 111 includes a cup-like structure 116 having a sealing surface 96, preferably continuous, that is configured along a lip at the top of the structure 116. The sealing surface 96 is configured to sealingly cooperate with a surface, preferably continuous, of an outwardly projecting portion of the molded article, such as a peripheral portion of a top and/or side surface of typical support ledge 91 of a preform bottle finish. Accordingly, the molded article picker 111 is preferably configured to surround the bottle finish on the open end portion of the preform and that the sealing surface 96 is to sealingly cooperate with a surface on a side of the support ledge 91 that is closest to the open end of the preform. Of course, other outwardly projecting surface portions of the preform may be useful as a complementary sealing surface. For example, the top or side surfaces of the pilfer band on some bottle finishes (not shown) may provide a suitable sealing surface.

In operation, when the tooling plate 100 approaches the tooling plate 107, during mold closing, the opening to the cup-like structure 116 is substantially closed by the support ledge 91 on the preform 109. The interior 93 of the structure 116 is connected to a vacuum structure such as by means of conduit 94 that is connected to a vacuum source (not shown). In the preferred embodiment, the conduit 94 is arranged through a retainer 118 that otherwise connects the cup-like structure 116 to the tooling plate 100. Once the top surface of the support ledge 91 is seated against the sealing surface 96 provided by the lip of the cup-like structure 116, a vacuum is created inside the preform 109 and the ledge 91 of the preform 109 is held tightly against the sealing surface 96 of the cup-like structure 116. When the mold opens after the next molding cycle, the preform 91 is held against the sealing surface 96 and thereby removed from the carrier 108 and subsequently dropped onto a conveyor (not shown) or the like when the cooling plate is rotated through ninety degrees. Of course, the structure 116 may have an alternative configuration that is something other than cup-like as long as the structure includes a continuous sealing surface 96 that is configured to cooperate with a surface of an outwardly projecting portion of the molded article. Likewise, the seal need not be perfect as leakage across the seal is acceptable so long as the sealing efficiency is sufficient to achieve and maintain a vacuum level that allows for the retention of the preform 109 therewith, once removed from the carrier 108.

In so doing the technical effect of the present invention may be achieved wherein the preform may be handled with contact along a portion thereof that is not sensitive to potential contamination by the molded article picker, and in particular that the molded article picker does not touch the aseptic portions of the interior of the preform or sensitive portions of the thread finish.

Various other exemplary embodiments of the molded article picker 211, 311, 411 will now be described. In the embodiments that follow, identical components have been given identical reference numbers. Where an otherwise similar component between the embodiments contains at least one distinct technical feature the component, and the similar technical features, are given distinct, but similar, reference numbers, wherein the prefix number to the feature is incremented (e.g. the cup-like structure 216 of the first alternative embodiment, with its distinct inclined surface 220, has a 200-series prefix in contrast to the 100-series prefix of the cup-like structure 116 of the preferred embodiment).

Figure 4:
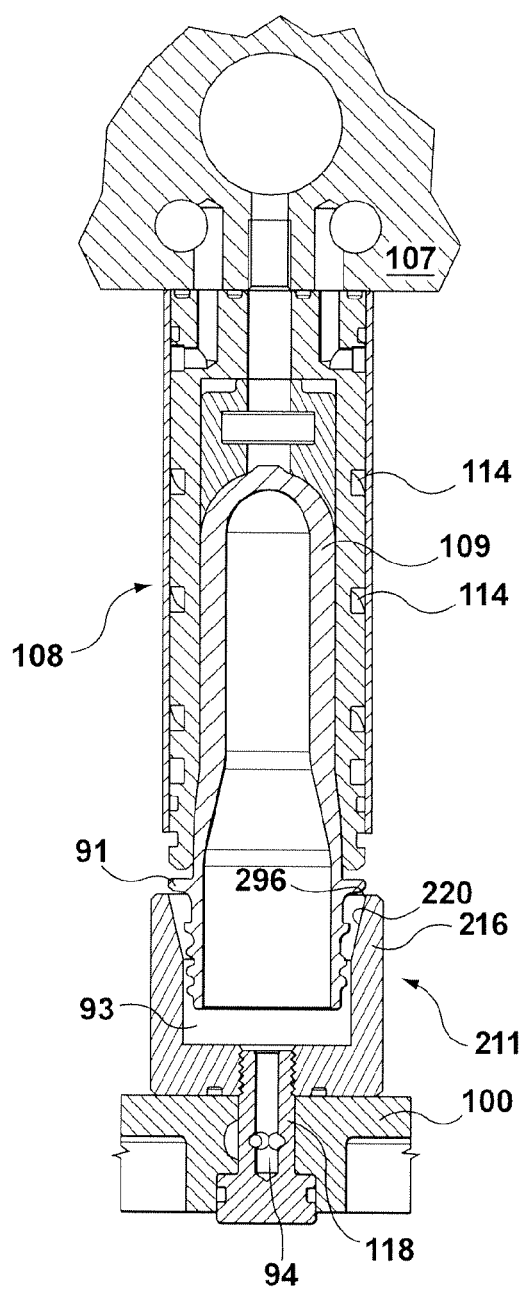
FIG. 4 is a sectional view of the preform being transferred from the carrier to another embodiment of the molded article picker.

Another embodiment of the second post-mold device is shown in FIG. 4. In this embodiment, the cup-like structure 116 has been replaced with a modified cup-like structure 216. The remaining elements of the tooling plate 100 and tooling plate 107 are unchanged and need not be further described. The structure 216 includes an inclined surface 220 on the inside of the structure 216. The inclined surface 220 engages the ledge 91 of the preform 109. The inclination of the surface 220 helps to align the preform 109 with the cup-like structure 216 such that the sealing surface 296, of the cup-like structure 216, and the support ledge 91, of the preform 109, may align before being substantially sealed together by the application of the vacuum in the structure 216. In this exemplary embodiment, the sealing surface 296 is provided along a conical upper portion of the inclined surface 220 that engages a periphery of the support ledge 91.

Figure 5:
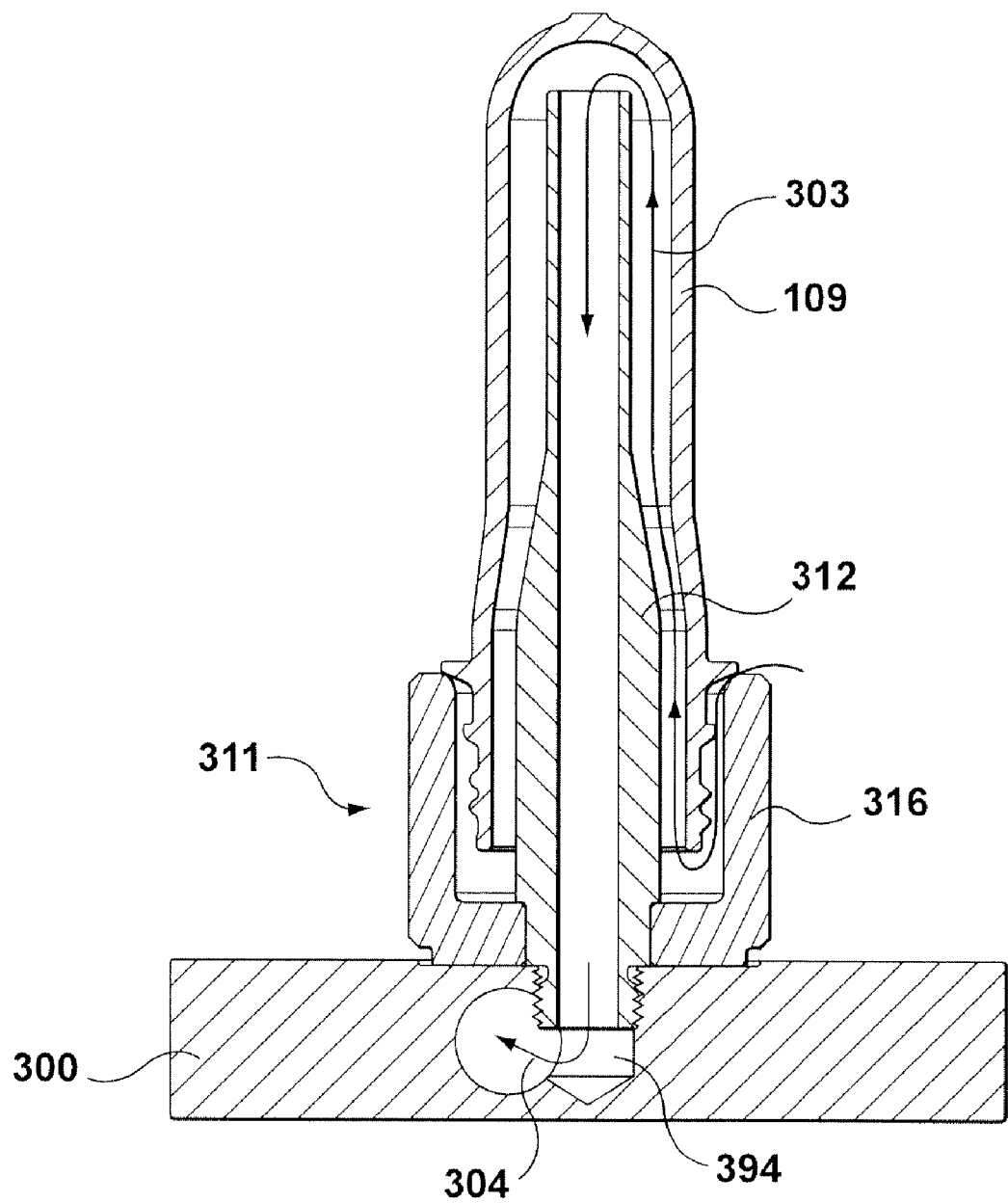
FIG. 5 is a sectional view of the preform being transferred from the carrier to another embodiment of the molded article picker.

Another exemplary embodiment of the second post-mold device is shown in FIG. 5. In this embodiment, a cooling pin 312 has been mounted on the tooling plate 300. With the exception of the way in which the cooling pin 312 and the molded article picker 311 are configured to mount to the tooling plate 300, the structure of the molded article picker 311 is the same as that shown in FIG. 3. In particular, the cooling pin 312 is mounted on the base of the structure 316 and threaded into the tooling plate 300. In this embodiment, the vacuum is drawn through conduit 394 in the direction of arrows 303 and 304. During the cooling portion of the cycle cooling air flows into the cooling pin 312 in a direction reverse to that shown by the arrows 303 and 304. This requires the provision of a valve (not shown) in the supply line (not shown) to the conduit 394 to switch from air flow to vacuum in the cooling pin 312.

Figure 6:
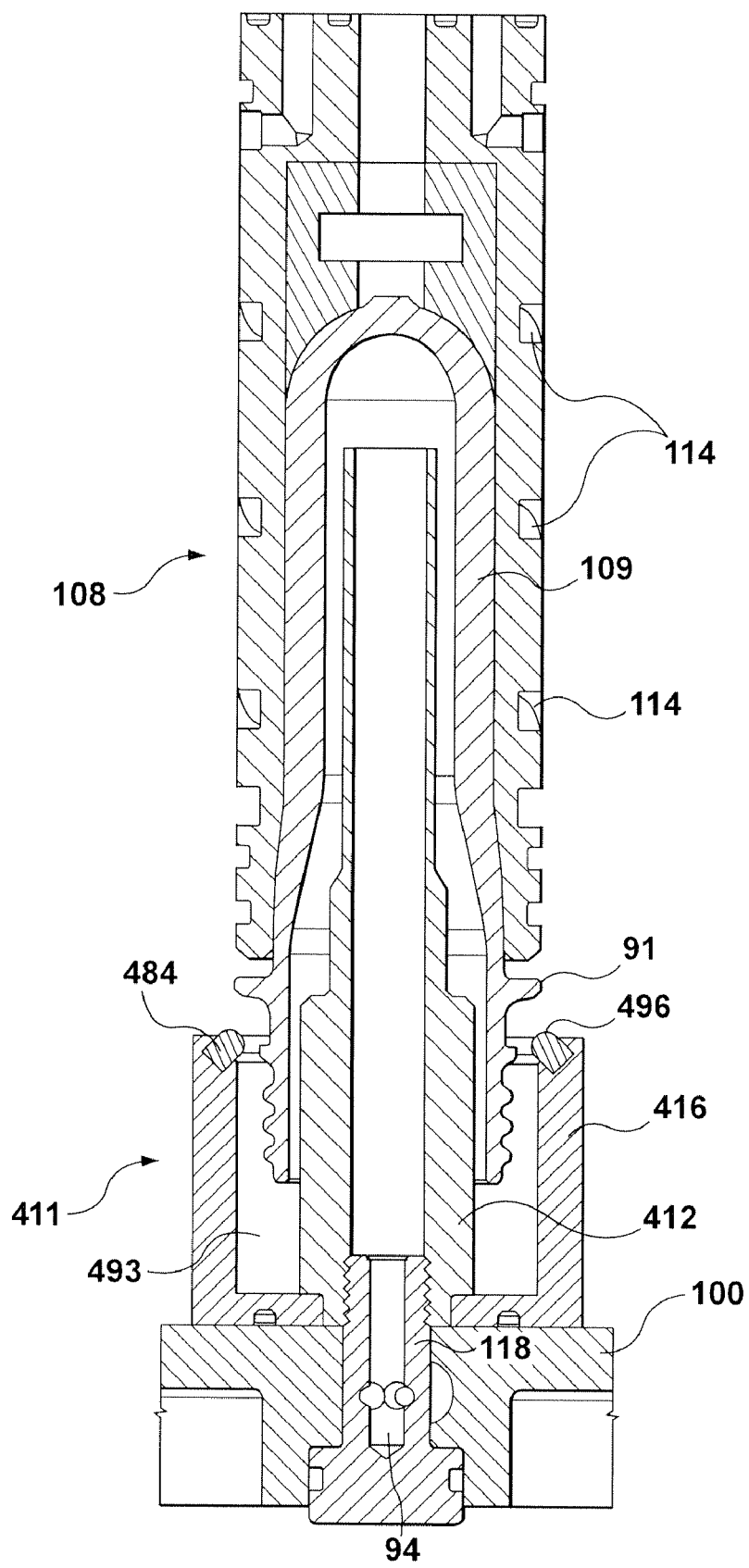
FIG. 6 is a sectional view of the preform being transferred from the carrier to yet a further embodiment of the molded article picker.

Yet a further embodiment of the second post-mold device is shown in FIG. 6. This embodiment is similar to the preceding embodiment shown in FIG. 5 except that the cup-like structure 416 now further includes a flexible pad 484 arranged around the lip thereof. The sealing surface 496 is provided along an exposed surface of the flexible pad 484. A cooling pin 412 is mounted on the tooling plate 400. The remaining elements of the tooling plate 400 are as previously described and need not be fully described here.

In operation of this embodiment, the surface of the support ledge 91, of the preform 109, engages the sealing surface 496, of the flexible pad 484, and creates a tight seal therebetween. This seal enables evacuation of the interior 493 of the structure 416 to create a vacuum and thereby hold the preform 109 on the tooling plate 400 when the tooling plate 107 is withdrawn.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims.

What is claimed is:

1. A method for transferring a molded article, comprising:
positioning a first post-mold device into an inboard position wherein a carrier of the first post-mold device is aligned with a molded article within an injection mold that is open;
transferring the molded article into the carrier;
moving the first post-mold device to an outboard position;
moving a second post-mold device having a molded article picker towards the carrier, wherein an open end portion of the molded article is surrounded within an interior of a structure of the molded article picker;
evacuating the interior to configure a seal between a sealing surface disposed on the structure and a surface of an outwardly projecting portion of the molded article, wherein the seal allows for the molded article to be retained with the structure;
moving the second post-mold device to withdraw the molded article from the carrier.

2. The method of claim 1, wherein:
the moving the second post-mold device towards the carrier is performed as the injection mold closes; and
the moving the second post-mold device to withdraw the molded article from the carrier is performed as the injection mold is opens.

* * * * *